United States Patent [19]
Gaeta et al.

[11] Patent Number: 6,167,066
[45] Date of Patent: Dec. 26, 2000

[54] LINEARLY-POLARIZED, SINGLE-FREQUENCY FIBER LASERS

[75] Inventors: Celestino John Gaeta, Simi Valley; Willie W. Ng, Agoura Hills; Stephen Lee Bourgholtzer, West Hills, all of Calif.

[73] Assignee: Hughes Electronics Corporation, El Segundo, Calif.

[21] Appl. No.: 09/057,893

[22] Filed: Apr. 9, 1998

[51] Int. Cl.[7] .................................. H01S 3/30; H01S 3/10; H01S 3/08

[52] U.S. Cl. .................................. 372/6; 372/27; 372/96; 372/102; 372/105

[58] Field of Search .................................. 372/6, 70, 71, 372/96, 102, 27, 28, 105

[56] References Cited

U.S. PATENT DOCUMENTS

| | | | |
|---|---|---|---|
| 5,561,675 | 10/1996 | Bayon et al. | 372/6 |
| 5,844,927 | 12/1998 | Kringlebotn | 372/6 |

OTHER PUBLICATIONS

Ball, G.A., et al., "60 mW 1.5 μm Single–Frequency Low–Noise Fiber Laser MOPA", *IEEE Photonics Technology Letters*, vol. 6, No. 2, Feb., 1994, pp. 192–194.

Zyskind, J.L., et al., "Short Single Frequency Erbium–Doped Fibre Laser", *IEE Electronics Letters*, vol. 28, No. 15, Jul., 1992, pp. 1385–1387.

*Primary Examiner*—Frank G. Font
*Assistant Examiner*—Armando Rodriguez
*Attorney, Agent, or Firm*—V. D. Duraiswamy; M. W. Sales

[57] ABSTRACT

Linearly-polarized, single-frequency fiber lasers are realized with optical fibers that have first and second refractive indices in a first fiber grating and third and fourth refractive indices in a second fiber grating. The first and third refractive indices are arranged along a first transverse fiber axis and the second and fourth refractive indices are arranged along a second transverse fiber axis. The grating periods and the first and third refractive indices are selected to generate spectrally-aligned signal reflectances along the first transverse axis and the grating periods and the second and fourth refractive indices are selected to generate spectrally-spaced signal reflectances along the second transverse axis. Thus, a fiber resonator is formed only along the first transverse axis and the fiber laser's output signal is linearly polarized.

27 Claims, 2 Drawing Sheets

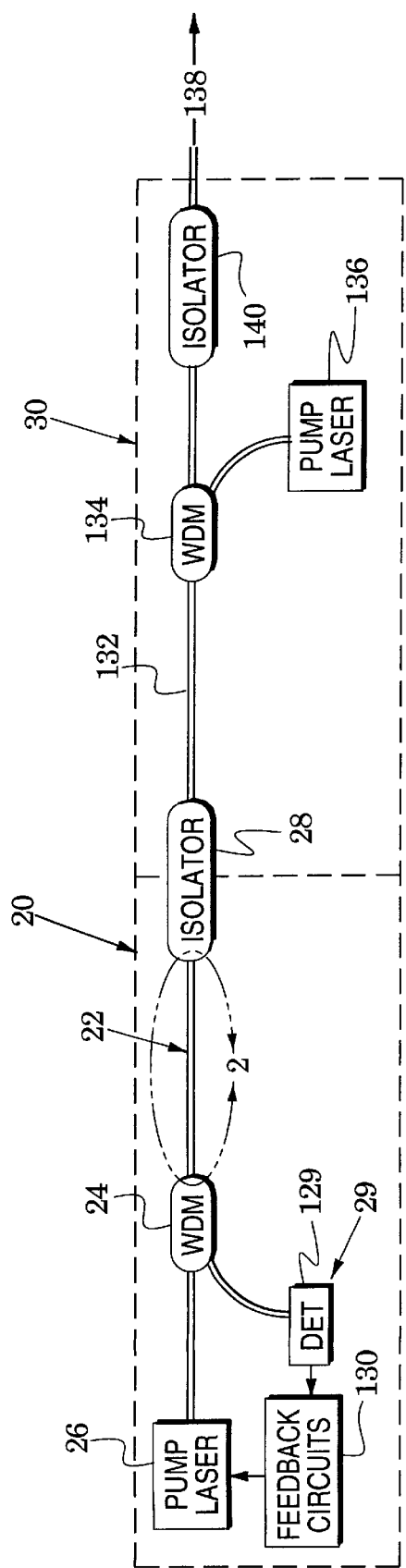
FIG. 1
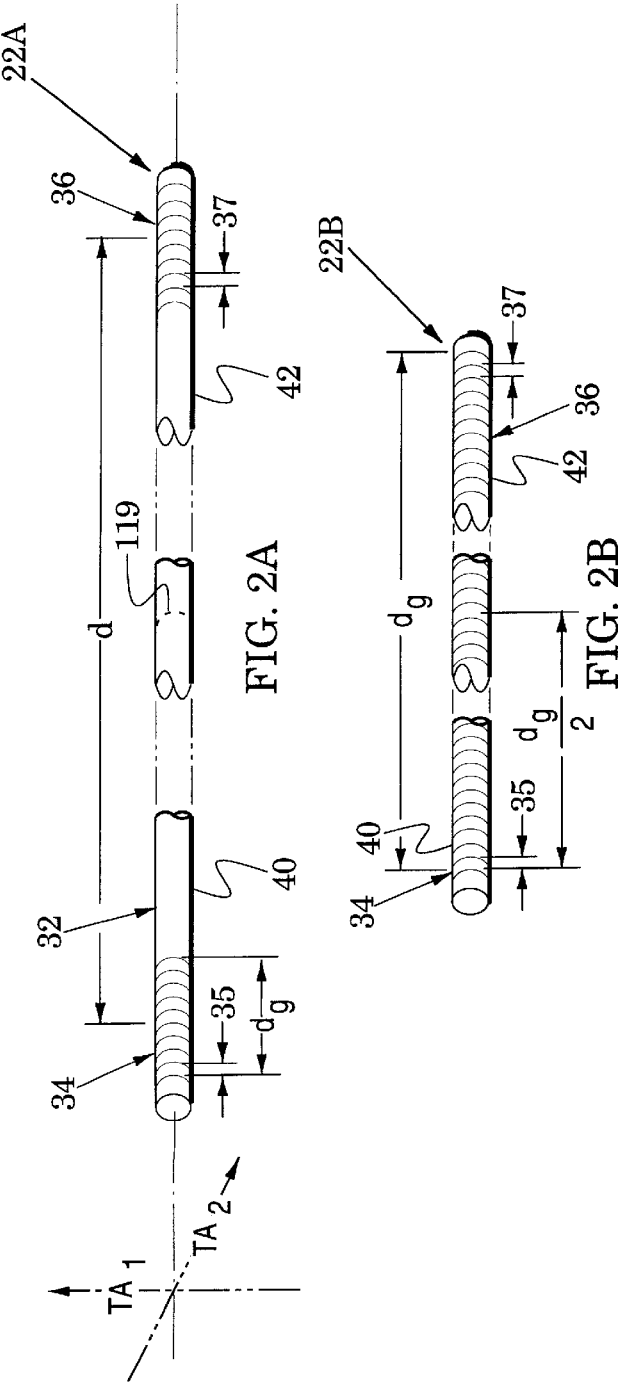
FIG. 2A
FIG. 2B

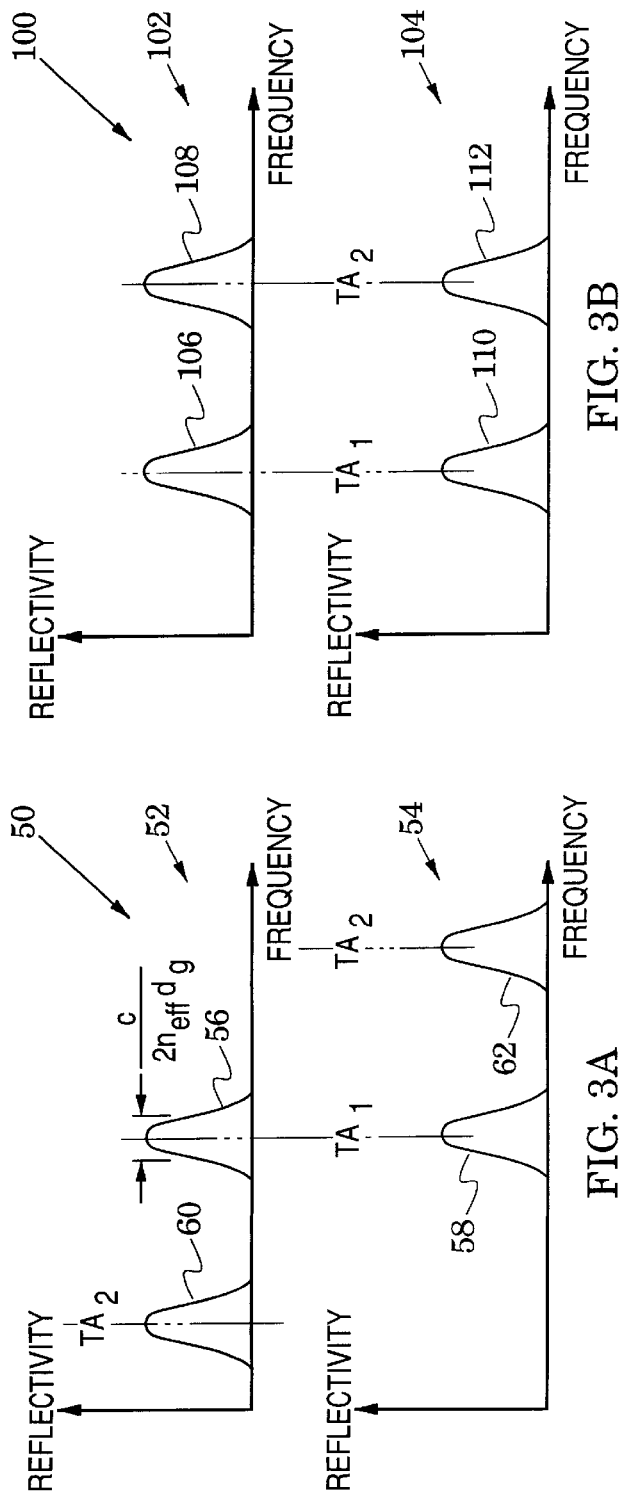
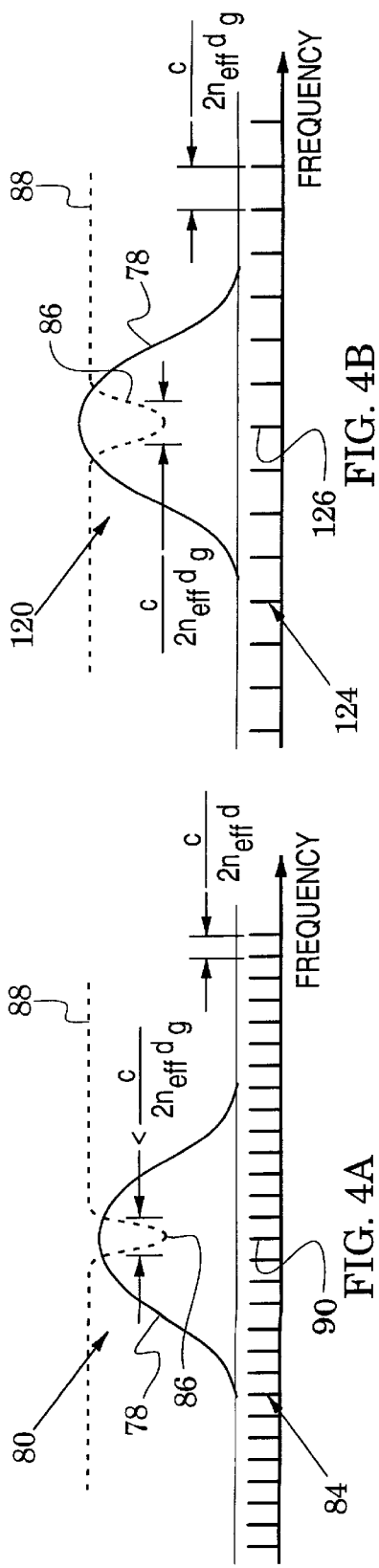

LINEARLY-POLARIZED, SINGLE-FREQUENCY FIBER LASERS

GOVERNMENT RIGHTS

This invention was made with Government support under Agreement No. DAAL01-95-2-3505. The Government has certain rights in the invention.

BACKGROUND OF THE INVENTION

1. Field of the Invention

The present invention relates generally to fiber lasers.

2. Description of the Related Art

When pumped with a light signal (e.g., at wavelengths of 800, 980 or 1480 nm), erbium-doped optical fibers have a broad laser transition near $\lambda=1.55$ $\mu$m which is substantially coincident with an optical-attenuation minimum in silica glass. Because of this coincidence, their high gain, simplicity and compact size and their inherent compatibility with optical fiber transmission lines and semiconductor pump lasers, erbium fiber lasers are particularly suited for a variety of laser applications (e.g., as repeaters and local oscillators) in fiber-based optical systems (e.g., communication systems and radar systems). The fiber laser's suitability for these applications is considerably enhanced if it can generate a single-frequency output signal.

Single frequency erbium-doped fiber lasers have been described in various references. In a first exemplary reference (Zyskind, J. L., et al., "Short Single Frequency Erbium-Doped Fibre Laser, *IEE Electronics Letters*, Vol. 28, No. 15, July, 1992, pp. 1385–1387), both optical feedback and wavelength selectivity were realized with fiber gratings. The gratings were formed in the fiber with refractive index changes that were induced with short wavelength (e.g., ~240 nm) radiation. Singlemode operation was obtained by configuring the cavity (between the gratings) short enough to realize mode spacing that was comparable to the bandwidth of the grating. The fiber was pumped through a wavelength-division-multiplexing coupler.

In a second exemplary reference (Ball, G. A., et al., "60 mW 1.5 mm Single-Frequency Low-Noise Fiber Laser MOPA", *IEEE Photonics Technology Letters*, Vol. 6, No. 2, February, 1994, pp. 192–194), an erbium-doped fiber laser system was described that had a spacing of ~2.5 cm between a pair of Bragg gratings. These intracore structures provided cavity feedback and mode selectivity. When the laser was pumped at 1480 nm, the polarization of the output signal was found to be elliptical with ~85% of the power along the elliptical major axis and ~15% along the elliptical minor axis. This fiber laser system also incorporated an analog noise feedback loop which suppressed intensity noise in the laser output by modifying a drive current of the system's laser pump.

Although the erbium fiber lasers of these references obtain single-frequency operation, they fail to provide structures capable of realizing linearly-polarized output signals. Linearly-polarized light is required for proper operation of many optical-processing devices. For example, intensity modulators (such as a Mach-Zehnder interferometer) typically combine phase-shifted, linearly-polarized signals to obtain an intensity-modulated output signal.

Accordingly, these conventional fiber lasers must generally be supplemented with a polarizer (e.g., a dichroic polarizer or a polarizing beam splitter) to be compatible with many optical systems. The size and cost of these optical systems are therefore increased. In addition, system efficiency is degraded because a polarizer will significantly reduce the laser's output power.

SUMMARY OF THE INVENTION

The present invention is directed to linearly-polarized, single frequency fiber lasers. Because these lasers can drive polarization-sensitive, optical-processing devices without intervening polarizers, they can enhance the efficiency and reduce the size and cost of optical systems.

These goals are realized with optical fibers that are doped with laser-active ions and which have first and second refractive indices in a first fiber grating and third and fourth refractive indices in a second fiber grating. The first and third refractive indices are arranged along a first transverse fiber axis and the second and fourth refractive indices are arranged along a second transverse fiber axis.

The grating periods and the first and third refractive indices are selected to generate spectrally-aligned signal reflectances along the first transverse axis and the grating periods and the second and fourth refractive indices are selected to generate spectrally-spaced signal reflectances along the second transverse axis. Thus, a fiber resonator is formed only along the first transverse axis. When driven with a laser pump, such optical fibers emit linearly-polarized radiation.

A fiber embodiment can be formed from a polarization-maintaining optical fiber that has first and second refractive indices along first and second transverse axes. The fiber is cleaved into first and second segments which are then rotated to align the first transverse axis of the first segment and the second transverse axis of the second segment. Finally, the two segments are joined (e.g., by fusing) and first and second gratings formed respectively in the first and second segments. The grating periods and the first and second refractive indices are selected to generate spectrally-aligned signal reflectances along one of the transverse axes. The grating periods and the first and second refractive indices will then generate spectrally-spaced signal reflectances along the other of the transverse axes.

The novel features of the invention are set forth with particularity in the appended claims. The invention will be best understood from the following description when read in conjunction with the accompanying drawings.

BRIEF DESCRIPTION OF THE DRAWINGS

FIG. 1 is a block diagram of a linearly-polarized, single frequency fiber laser system in accordance with the present invention;

FIG. 2A is an enlarged view of an optical transmission line within the curved line 2 of FIG. 1;

FIG. 2B is a view similar to FIG. 2A which illustrates another optical transmission line embodiment for the fiber laser of FIG. 1;

FIG. 3A is a graph of reflectivity in the optical transmission lines of FIGS. 2A and 2B;

FIG. 3B is a graph of reflectivity in a conventional polarization-maintaining optical fiber and grating structure;

FIG. 4A is an illustration of longitudinal mode selection in the fiber laser of FIG. 1 with the optical fiber embodiment of FIG. 2A; and FIG. 4B is an illustration of longitudinal mode selection in the fiber laser of FIG. 1 with the optical fiber embodiment of FIG. 2B.

DETAILED DESCRIPTION OF THE PREFERRED EMBODIMENTS

A linearly-polarized, single frequency fiber laser system 20 is illustrated in FIG. 1. The fiber laser incudes an optical transmission line 22 which is pumped through a directional optical coupler 24 by a semiconductor laser pump 26. The output signal of the fiber laser is delivered through an isolator 28. Noise in the fiber laser's output is reduced by use of a noise-reduction feedback loop 29. If desired, the fiber laser's output power can be increased with a fiber amplifier 30.

A distributed Bragg reflector (DBR) embodiment 22A of the optical transmission line is shown in FIG. 2A and a distributed feedback (DFB) embodiment 22B of the optical transmission line is shown in FIG. 2B. An operational description of the fiber laser 20 is enhanced by preceding it with the following description of the DBR transmission line 22A.

The DBR transmission line 22A has an optical fiber 32 and spaced first and second gratings 34 and 36 in the fiber. Preferably, the optical fiber 32 is a polarization-maintaining optical fiber with different refractive indices along different transverse axes. The gratings may be realized with various conventional grating structures (e.g., annular physical rings or transverse fiber elements having alternating high and low refraction indices) that are formed with various conventional fabrication processes (e.g., physical etching or short-wavelength radiation). The first grating 34 is formed with a first period 35 and the second grating 36 is formed with a second period 37 (in this example, the second period is illustrated as greater than the first period). The gratings 34 and 36 each have a grating length $d_g$ and their centers are spaced apart by a space d.

A first segment 40 of the optical fiber 32 preferably includes all of the grating 34 and a second segment 42 of the optical fiber 32 preferably includes all of the grating 36. Along a first transverse fiber axis $TA_1$, the first fiber segment 40 has a first refractive index and along a second transverse fiber axis $TA_2$, the first fiber segment 40 has a second refractive index. The first and second refractive indices may be different, i.e., the fiber segment 40 may be birefringent with respect to the two transverse fiber axes (the first and second transverse axes are indicated at the left side of FIG. 2A).

In a similar manner, the second fiber segment 42 has a third refractive index along the first transverse fiber axis $TA_1$ and has a fourth refractive index along the second transverse fiber axis $TA_2$. The third and fourth refractive indices may also differ from each other, i.e., the second fiber segment 42 may also be birefringent with respect to the two transverse fiber axes.

In accordance with the invention, the first refractive index and the first period 35 are chosen to generate a first optical signal reflectance at a first optical frequency. Similarly, the third refractive index and the second period 37 are chosen to generate a third optical signal reflectance substantially at the same first optical frequency.

This relationship in reflectances is illustrated in a graph 50 of FIG. 3A in which an upper graph portion 52 shows reflectances of the first grating 34 and a lower graph portion 54 shows reflectances of the second grating 36. In the graph, the first reflectance 56 and the third reflectance 58 are shown to be substantially spectrally aligned.

In a first exemplary embodiment, the first and second grating periods (35 and 37 in FIG. 1) are equal and the first and third refractive indices are also equal. In a second exemplary embodiment, the first and second grating periods are different and the first and third refractive indices are also different.

If a guided wave travels with a wavelength $\lambda_g$ through an optical fiber with an effective refractive index $n_{eff}$, a grating with a period p will generate a reflectance when the Bragg condition of $p=\lambda_g/2n_{eff}$ is satisfied (the effective refractive index of an optical fiber is dependent, in part, upon the refractive index distribution of the fiber). In the exemplary embodiment of FIG. 2A, the second grating period 37 has been selected to be greater than the first grating period 35. In this embodiment, therefore, the first refractive index is greater than the third refractive index.

The frequency response of a grating is inversely related to its length. In particular, the frequency widths of the reflectances of FIG. 3A are given by $c/(2n_{eff}d_g)$ in which $n_{eff}$ is the effective refractive index of the optical fiber 32. This reflectance width is indicated in FIG. 3A for the first reflectance 56.

In further accordance with the invention, the second refractive index and the first period 35 are chosen to generate a second optical signal reflectance at a second optical frequency. Similarly, the fourth refractive index and the second period 37 are chosen to generate a fourth optical signal reflectance at a fourth optical frequency that is different from the second optical frequency. This relationship in reflectances is also illustrated in the graph 50 in which the second reflectance 60 and the fourth reflectance 62 are shown to be spectrally spaced apart.

A first embodiment with equal first and second grating periods was referred to above. In this embodiment, the second and fourth refractive indices are different. A second embodiment with different first and second grating periods was also referred to above. In this embodiment, the second and fourth refractive indices may be different or equal to obtain spectral spacing between the second and fourth reflectances that prevents feedback along the second transverse axis $TA_2$. In the exemplary embodiment of FIG. 2A, the second grating period 37 has been selected to be greater than the first grating period 35. In this embodiment, therefore, the fourth refractive index is less than the third refractive index.

In the embodiment illustrated in FIG. 3A, the first and third reflectances are spectrally aligned along the first transverse axis $TA_1$ and the second and fourth reflectances are spectrally spaced along the second transverse axis $TA_2$. Although the second and fourth reflectances both differ from the first and third reflectances in this embodiment, it is only necessary in general that they differ from each other (i.e., one of the second and fourth reflectances may be aligned with the first and third reflectances).

In describing the operation of the fiber laser 20 of FIG. 1, it is helpful to recall that a fiber laser is an optical oscillator which includes an optical amplifier and a positive feedback structure. The amplifier is a distributed amplifying medium and the feedback is obtained by placing the amplifying medium in an optical resonator.

In the fiber laser 20, the amplifying medium is the erbium-doped optical fiber 32 and the optical resonator is formed by reflectances of the first and second gratings 34 and 36. Laser radiation from the laser pump 26 "pumps" erbium ions in the optical fiber 32 to higher energy levels and this effect generates photons through subsequent stimulated emission.

The "gain" of the amplifying medium is a measure of the amount of stimulated emissions a photon generates as it travels a unit distance through the amplifying medium. The gain of the erbium-doped optical fiber 32 is shown as a gain profile 78 in the mode selection illustrations 80 of FIG. 4A and 120 of FIG. 4B. The gain profile is determined by the stimulation response characteristics of erbium.

An optical resonator exists along the first transverse axis $TA_1$ of the optical transmission line (22A in FIG. 2A) as indicated by the spectral alignment of the first and third reflectances (56 and 58 of FIG. 3A). Accordingly, laser action occurs along this axis and radiation that is polarized along the first transverse axis $TA_1$ is emitted through the optical isolator (28 in FIG. 1). In contrast, an optical resonator does not exist along the second transverse axis $TA_2$ of the optical transmission line. This is evident because of the spectral displacement of the second and fourth reflectances (60 and 62 in FIG. 3A). Accordingly, laser action does not occur along the second transverse axis $TA_2$ and no radiation along this axis is radiated through the isolator (to enhance the invention's description, the transverse axis associated with each reflectance is indicated in FIG. 3A).

The optical resonator of the optical transmission line (22 in FIG. 1) has a length that is established by the spacing d between its gratings (34 and 36 in FIG. 1). This Fabry-Perot resonator can provide feedback at any guided wavelength $\lambda_g$ which coincides with one of a plurality of longitudinal resonator modes 84 that are spaced apart in frequency by $c/(2n_{eff}d)$ as shown in FIG. 4A.

The optical resonator has a frequency response along the first transverse axis $TA_1$ that is generally less than $c/(2n_{eff}d_g)$ because it is the product of the first and third reflectances 56 and 58. This resonance can be represented as a dip 86 in the loss 88 of the optical resonator as shown by broken lines in FIG. 4A. This dip in resonator loss permits laser action in only a selected longitudinal mode 90 of the possible longitudinal resonator modes 84. Accordingly, the fiber laser 20 of FIG. 1 generates a linearly-polarized, single frequency laser signal through the isolator 28.

In contrast to the linearly-polarized, single frequency operation of the fiber laser 20 of FIG. 1, the graph 100 of FIG. 3B illustrates why conventional polarization-maintaining fiber lasers generate radiation with multiple polarizations. The graph 100 is similar to the graph 50 of FIG. 3A with an upper graph 102 and a lower graph 104.

Conventional polarization-maintaining fiber lasers typically employ a polarization-maintaining optical fiber having first and second spaced gratings and having first and second refractive indices respectively along first and second transverse axes. The first and second refractive indices typically extend along the entire length of the fiber. As a consequence, the first grating generates first and second reflectances 106 and 108 along the first and second transverse axes that are spaced apart because of the Bragg condition of $p=\lambda_g/2n_{eff}$ and the difference between the first and second refractive indices.

In order to create a resonator, the second grating must be selected to generate, with the first refractive index, a third reflectance 110 that is substantially spectrally aligned with the first reflectance 106. This requirement establishes a period p for the second grating in accordance with the Bragg condition of $p=\lambda_g/2n_{eff}$. However, the third and fourth reflectances 110 and 112 will also be spaced apart because of the difference between the first and second refractive indices and this spacing is the same as that between the first and second reflectances 106 and 108. As shown in FIG. 3B, therefore, the second and fourth reflectances 108 and 112 are also substantially spectrally aligned. Thus, resonators are established along both of the first and second transverse axes so that these conventional polarization-maintaining fiber lasers emit radiation with polarizations along multiple axes.

A fiber laser embodiment of the invention can be realized by modifying a polarization-maintaining optical fiber that has first and second refractive indices along respectively first and second transverse axes. The optical fiber is cleaved into first and second segments (e.g., the segments 40 and 42 of FIG. 2A) which are axially rotated with respect to each other (e.g., by 90°) and spliced back together (e.g., along the broken line 119 in FIG. 2A).

First and second gratings are then formed in the first and second segments. The periods of these gratings are selected so that they generate, with the first refractive index in the first segment and the second refractive index in the second segment, reflectances (e.g., 56 and 58 in FIG. 3A) that are spectrally aligned. The first and second gratings will then generate, with the second refractive index in the first segment and the first refractive index in the second segment, reflectances (e.g., 60 and 62 in FIG. 3A) along the second transverse axis that are spaced below and above the reflectances along the first transverse axis.

The DFB optical transmission line 22B is shown in FIG. 2B which is similar to FIG. 2A with like elements indicated by like reference numbers. The DFB transmission line 22B differs by having its first and second gratings 34 and 36 positioned in an adjoining arrangement rather than a spaced arrangement and by having a total length of $d_g$.

FIG. 4B is a mode selection illustration 120 that corresponds to the DFB transmission line 22B. It is similar to the mode selection illustration 80 of FIG. 4A with like elements indicated by like reference numbers. In contrast to the mode selection illustration 80, however, it has a plurality of longitudinal resonator modes 124 which are spaced apart by $c/(2n_{eff}d_g)$.

Thus, the bandwidth of the loss dip 86 is substantially the same as the spacing between resonator modes. Similar to the DBR optical transmission line (22A in FIG. 2A), this dip permits laser action in only a selected longitudinal mode 126 of the possible longitudinal resonator modes 124.

The noise-reduction feedback loop 29 of FIG. 1 includes an intensity detector 129 and feedback circuits 130 that are configured to adjust the pump laser's gain in response to the laser power as detected by the detector 129. As previously stated, the output power of the laser fiber 20 of FIG. 1 can be enhanced with a fiber amplifier 30 which includes an erbium-doped, polarization-maintaining optical fiber 132. The fiber 132 is pumped through a coupler 134 by an optical pump 136. The amplifier's output signal 138 is delivered through an isolator 140.

Although the optical transmission line 22 has been shown in FIG. 1 to be pumped with a copropagating pump signal, other embodiments of the invention may be formed with different pump signal arrangements (e.g., a counterpropagating pump signal).

Exemplary optical couplers for use in the invention include evanescent-field directional couplers and exemplary optical isolators for use in the invention include optical devices based on the Faraday effect.

The invention has been described with reference to first and second transverse axes $TA_1$ and $TA_2$ of an optical transmission line. In embodiments of the invention, these axes must not be colinear but they may assume any other spatial relationship including an orthogonal relationship.

Although the teachings of the invention have been described with respect to erbium-doped fiber lasers, the invention may be practiced with fibers that are doped with any laser-active ions such as others of the rare-earth ions (e.g., neodymium and ytterbium).

The gratings of the invention can be formed by various conventional processes. In an exemplary one, the optical fiber is exposed to short wavelength radiation (e.g., ~ultraviolet radiation) through binary phase masks.

Fiber lasers of the invention are suited for a variety of applications (e.g., repeaters and local oscillators) in a variety of fiber-based optical systems (e.g., communication systems and radar systems). Fiber lasers of the invention may be pumped by various laser sources but they are especially compatible with semiconductor pump lasers.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A linearly-polarized, single frequency fiber laser, comprising:
   a pump laser that generates an optical pump signal;
   an optical fiber arranged to receive said optical pump signal, said optical fiber having a first transverse axis and a second transverse axis and at least a portion of said optical fiber doped with laser-active ions so that said optical fiber exhibits photon gain in response to said optical pump signal;
   a first grating in said optical fiber that is configured with a first period;
   a second grating in said optical fiber that is configured with a second period;
   a first segment of said optical fiber which has a first refractive index along said first transverse axis and a second refractive index along said second transverse axis, said first segment positioned to at least partially include said first grating; and
   a second segment of said optical fiber which has a third refractive index along said first transverse axis and a fourth refractive index along said second transverse axis, said second segment positioned to at least partially include said second grating;
   wherein:
   said first refractive index and said first period are chosen to generate a first optical signal reflectance at a first optical frequency;
   said second refractive index is chosen to generate, with said first period, a second optical signal reflectance at a second optical frequency;
   said third refractive index and said second period are chosen to generate a third optical signal reflectance substantially at said first optical frequency; and
   said fourth refractive index is chosen to generate, with said second period, a fourth optical signal reflectance at a fourth optical frequency that is different from said second optical frequency;
   said first and third signal reflectances providing feedback at said first optical frequency which cooperates with said photon gain to generate a laser signal having a polarization substantially aligned with said first transverse axis while said second and fourth signal reflectances fail to provide feedback that is necessary to generate a laser signal having a polarization substantially aligned with said second transverse axis.

2. The fiber laser of claim 1, wherein said first and second periods are equal and said first and third refractive indices are equal.

3. The fiber laser of claim 1, wherein said first and second periods are different and said first and third refractive indices are different.

4. The fiber laser of claim 1, wherein one of said second and fourth optical signal reflectances is spectrally aligned with said first and third optical signal reflectances.

5. The fiber laser of claim 1, wherein said first and second gratings are in a spaced arrangement.

6. The fiber laser of claim 1, wherein said first and second gratings are in an adjoining arrangement.

7. The fiber laser of claim 1, wherein said first grating and said second grating each include a plurality of transverse fiber elements and adjacent transverse fiber elements have different refraction indices.

8. The fiber laser of claim 1, further including an optical coupler arranged to couple said pump laser and said optical fiber.

9. The fiber laser of claim 1, wherein said laser-active ions are rare-earth ions.

10. The fiber laser of claim 9, wherein said rare-earth ions are erbium ions.

11. The fiber laser of claim 1, wherein said pump laser is a semiconductor laser.

12. The fiber laser of claim 1, wherein said first and second polarization axes are orthogonally arranged.

13. A linearly-polarized fiber laser, comprising:
   a pump laser that generates an optical pump signal; and
   an optical fiber arranged to receive said optical pump signal with at least a portion of said optical fiber doped with laser-active ions so that said optical fiber exhibits photon gain in response to said optical pump signal, said optical fiber including:
   a) first and second polarization-maintaining optical fibers, each of said polarization-maintaining optical fibers having a first refractive index along a first transverse axis and a second refractive index along a second transverse axis;
   b) a first grating in said first polarization-maintaining optical fiber that is configured with a first period; and
   c) a second grating in said second polarization-maintaining optical fiber that is configured with a second period;
   wherein:
   said first and second polarization-maintaining optical fibers are coupled together with the first transverse axis of said first polarization-maintaining optical fiber substantially aligned with the second transverse axis of said second polarization-maintaining optical fiber and the second transverse axis of said first polarization-maintaining optical fiber is substantially aligned with the first transverse axis of said second polarization-maintaining optical fiber;
   said first refractive index and said first period are chosen to generate a first optical signal reflectance at a first optical frequency; and
   said second refractive index and said second period are chosen to generate a second optical signal reflectance at said first optical frequency;
   said first and second signal reflectances providing feedback at said first optical frequency which cooperates with said photon gain to generate a laser signal having a polarization substantially aligned with the first transverse axis of said first polarization-maintaining optical fiber; and
   said second refractive index and said first period thus generating a signal reflectance at a frequency different from one generated by said first refractive index and said second period.

14. The fiber laser of claim 13, wherein said first and second gratings are in a spaced arrangement.

15. The fiber laser of claim 13, wherein said first and second gratings are in an adjoining arrangement.

16. The fiber laser of claim 13, wherein said first grating and said second grating each include a plurality of transverse fiber elements and adjacent transverse fiber elements have different refraction indices.

17. The fiber laser of claim 13, further including an optical coupler arranged to couple said pump laser and said optical fiber.

18. The fiber laser of claim 13, wherein said laser-active ions are rare-earth ions.

19. The fiber laser of claim 18, wherein said rare-earth ions are erbium ions.

20. The fiber laser of claim 13, wherein said pump laser is a semiconductor laser.

21. An optical transmission line for generating spectrally-aligned reflectances along one transverse axis and spectrally-spaced relfectances along another transverse axis, comprising:

an optical fiber arranged having a first transverse axis and a second transverse axis;

a first grating in said optical fiber that is configured with a first period;

a second grating in said optical fiber that is configured with a second period, said second period different than said first period;

a first segment of said optical fiber which has a first refractive index along said first transverse axis and a second refractive index along said second transverse axis, said first segment positioned to at least partially include said first grating; and a second segment of said optical fiber which has a third refractive index along said first transverse axis and a fourth refractive index along said second transverse axis, said second segment positioned to at least partially include said second grating;

wherein:

said first refractive index and said first period are chosen to generate a first optical signal reflectance at a first optical frequency;

said second refractive index is chosen to generate, with said first period, a second optical signal reflectance at a second optical frequency;

said third refractive index and said second period are chose to generate a third optical signal reflectance substantially at said first optical frequency; and said fourth refractive index is chosen to generate, with said second period, a fourth optical signal reflectance at a fourth optical frequency that is different from said second optical frequency.

22. The fiber laser of claim 21, wherein one of said second and fourth optical signal reflectances is spectrally aligned with said first and third optical signal reflectances.

23. The optical transmission line of claim 21, wherein said first and second gratings are in a spaced arrangement.

24. The optical transmission line of claim 21, wherein said first and second gratings are in an adjoining arrangement.

25. An optical transmission line for generating spectrally-aligned reflectances along one transverse axis and spectrally-spaced reflectances along another transverse axis, comprising:

first and second polarization-maintaining optical fibers, each of said optical fibers having a first refractive index along a first transverse axis and a second refractive index along a second transverse axis;

a first grating in said first optical fiber that is configured with a first period; and a second grating in said second optical fiber that is configured with a second period;

wherein:

said first and second optical fibers are coupled together with the first transverse axis of said first optical fiber substantially aligned with the second transverse axis of said second optical fiber and the second transverse axis of said first optical fiber substantially aligned with the first transverse axis of said second optical fiber;

said first refractive index and said first period are chosen to generate a first optical signal reflectance at a first optical frequency; and said second refractive index and said second period are chosen to generate a second optical signal reflectance at said first optical frequency.

26. The optical transmission line of claim 25, wherein said first and second gratings are in a spaced arrangement.

27. The optical transmission line of claim 25, wherein said first and second gratings are in an adjoining arrangement.

* * * * *